United States Patent [19]

Kurusu et al.

[11] Patent Number: 5,455,313

[45] Date of Patent: Oct. 3, 1995

[54] SILICONE RUBBER COMPOSITION FOR FIXING ROLL SERVICE

[75] Inventors: Hidetoshi Kurusu; Akito Nakamura; Yoshito Ushio, all of Chiba, Japan

[73] Assignee: Dow Corning Toray Silicon Co., Ltd., Tokyo, Japan

[21] Appl. No.: 259,810

[22] Filed: Jun. 15, 1994

[30] Foreign Application Priority Data

Jul. 29, 1993 [JP] Japan .................................. 5-209024

[51] Int. Cl.⁶ .................................................. C08L 83/05
[52] U.S. Cl. ..................... 525/478; 525/479; 428/35.8; 428/36.8; 428/36.9; 492/28
[58] Field of Search ................... 525/478, 479; 492/28; 428/35.8, 36.8, 36.9

[56] References Cited

U.S. PATENT DOCUMENTS

| | | | |
|---|---|---|---|
| 4,830,893 | 5/1989 | Nakamura et al. | 428/35.8 |
| 5,034,061 | 7/1991 | Maguire et al. | 525/478 |
| 5,362,781 | 11/1994 | Stein | 525/478 |
| 5,366,809 | 11/1994 | Schmidt et al. | 525/478 |

FOREIGN PATENT DOCUMENTS

| | | |
|---|---|---|
| 149354 | 9/1982 | Japan . |
| 164741 | 6/1992 | Japan . |

OTHER PUBLICATIONS

Japanese Industrial Standard JIC C 2123.

*Primary Examiner*—Melvyn I. Marquis
*Attorney, Agent, or Firm*—William F. Boley

[57] ABSTRACT

The present invention relates to a silicone rubber composition for fixing roll service. More specifically, the invention relates to a silicone rubber composition for fixing roll service that is easily molded into a fixing roll as used in devices such as electrophotographic copiers, facsimile machines, and laser printers and that yields a fixing roll with an excellent mechanical strength and excellent toner release properties.

16 Claims, No Drawings

SILICONE RUBBER COMPOSITION FOR FIXING ROLL SERVICE

BACKGROUND OF INVENTION

The present invention relates to a silicone rubber composition for fixing roll service. More specifically, the invention relates to a silicone rubber composition for fixing roll service that is easily molded into a fixing roll as used in devices such as electrophotographic copiers, facsimile machines, and laser printers and that yields a fixing roll with an excellent mechanical strength and excellent toner release properties.

Contact thermal fixing is widely used in electrophotographic copiers, facsimile machines, and laser printers. In this process, the toner image, after its electrophotographic formation on a photoreceptor and transfer to copy paper, is fixed by a fixing roll. The fixing rolls used in contact thermal fixing are fabricated by coating a silicone rubber composition on the circumference of a metal shaft and then curing the composition.

Silicone rubber compositions heretofore proposed for fixing roll service are generally exemplified by the following:

(i) the silicone rubber composition for fixing roll service taught in Japanese Patent Application Laid Open [Kokai] Number Sho 57-149354 [149,354/1982], which consists of alkenyl-containing organopolysiloxane with a viscosity of 100 to 100,000 centipoise at 25° C., organohydrogenpolysiloxane with a viscosity of 1 to 5,000 centipoise at 25° C., inorganic filler, alkenyl-free organopolysiloxane with a viscosity of 10 to 5,000 centipoise at 25° C., and platinum catalyst;

(ii) the silicone rubber composition for fixing roll service taught in Japanese Patent Application Laid Open Number Sho 63-186024 [186,024/1988], which consists of organopolysiloxane that contains at least 2 alkenyl groups in each molecule, organopolysiloxane resin that contains at least 2 silicon-bonded hydrogen in each molecule, and platinum catalyst; and (iii) the silicone rubber composition for fixing roll service taught in Japanese Patent Application Laid Open Number Hei 4-164741 [164,741/1992], which consists of polyorganosiloxane that contains at least 2 vinyl groups in each molecule and has a viscosity at 25° C. of 500 to 500,000 centipoise, organohydrogensiloxane that contains at least 3 silicon-bonded hydrogens in each molecule, inorganic filler, and a platinum compound.

However, because the silicone rubber compositions for fixing roll service taught in Japanese Patent Application Laid Open Numbers Sho 57-149354, Sho 63-186024, and Hei 4-164741 contain an inorganic filler such as silica micropowder, quartz powder, and so forth, the fixing rolls obtained therefrom suffer from a gradual decline in their toner release properties with increasing copy mileage and it eventually becomes impossible to obtain clear copies. At the same time, silicone rubber compositions for fixing roll service that lack an inorganic filler such as silica micropowder, quartz powder, etc., yield fixing rolls with a low mechanical strength that will not support practical applications.

SUMMARY OF INVENTION

The present invention relates to a silicone rubber composition for fixing roll service. More specifically, the invention relates to a silicone rubber composition for fixing roll service that is easily molded into a fixing roll as used in devices such as electrophotographic copiers, facsimile machines, and laser printers and that yields a fixing roll with an excellent mechanical strength and excellent toner release properties.

DESCRIPTION OF INVENTION

The present invention relates to an inorganic filler-free silicone rubber composition for fixing roll service that comprises:

(A) 100 weight parts diorganopolysiloxane mixture consisting essentially of
  (a) 10 to 90 weight % diorganopolysiloxane that contains at least 2 alkenyl groups in each molecule and that has a viscosity at 25° C. of 100 to 100,000 centipoise and
  (b) 90 to 10 weight % diorganopolysiloxane that contains at least 2 alkenyl groups in each molecule and that has a viscosity at 25° C. of at least 1,000,000 centipoise, (B) 5 to 100 weight parts organopolysiloxane resin with the general formula

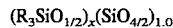

in which R denotes a monovalent hydrocarbon group and x has a value of 0.6 to 4.0, (C) organopolysiloxane that contains at least 2 silicon-bonded hydrogen atoms in each molecule, in a quantity that yields 0.6 to 20 moles silicon-bonded hydrogen in component (C) per 1 mole total alkenyl groups in components (A) and (B), and (D) platinum catalyst in a catalytic quantity.

The silicone rubber composition for fixing roll service in accordance with the present invention is explained in greater detail below.

The diorganopolysiloxane mixture (A) is the base or principal material of the invention composition. It is composed of a diorganopolysiloxane (a) and a diorganopolysiloxane (b). Diorganopolysiloxane (a) must contain at least 2 alkenyl groups in each molecule. The molecular structure of component (a) is not specifically restricted and may be, for example, straight chain, partially branched straight chain, resin, network, or cyclic. Straight chain and partially branched straight chain are preferred for the molecular structure. The alkenyl group in component (a) is specifically exemplified by vinyl, allyl, butenyl, pentenyl, and hexenyl, and the vinyl group is preferred. The alkenyl group may be bonded in any position on the molecular chain, for example, in terminal or nonterminal position. There are no limitations on the non-alkenyl organic groups in component (a), and these groups are exemplified by alkyl groups such as methyl, ethyl, propyl, and so forth; aryl groups such as phenyl, tolyl, xylyl, and so forth; aralkyl groups such as benzyl, phenethyl, and so forth; and substituted alkyl groups such as 3-chloropropyl, 3,3,3-trifluoropropyl, and so forth. Methyl and phenyl are the preferred non-alkenyl organic groups.

The viscosity of component (a) at 25° C. must fall in the range of 100 to 100,000 centipoise. The resulting fixing roll will have a sharply reduced mechanical strength when component (a) has a viscosity below 100 centipoise, while a component (a) viscosity in excess of 100,000 centipoise makes the resulting silicone rubber composition difficult to handle and substantially impairs its ability to be molded into a fixing roll.

Component (a) is specifically exemplified by the following:

dimethylvinylsiloxy-endblocked dimethylpolysiloxanes,
dimethylvinylsiloxy-endblocked methylvinylpolysiloxanes,
dimethylvinylsiloxy-endblocked methylphenylpolysiloxanes,
dimethylvinylsiloxy-endblocked dimethylsiloxane-methylvinylsiloxane copolymers,
dimethylvinylsiloxy-endblocked dimethylsiloxane-methylphenylsiloxane copolymers, dimethylvinylsiloxy-endblocked dimethylsiloxane-methylvinylsiloxane-methylphenylsiloxane copolymers, trimethylsiloxy-endblocked methylvinylpolysiloxanes,
trimethylsiloxy-endblocked dimethylsiloxane-methylvinylsiloxane copolymers,
trimethylsiloxy-endblocked dimethylsiloxane-methylvinylsiloxane-methylphenylsiloxane copolymers,
dimethylhydroxysiloxy-endblocked methylvinylpolysiloxanes,
dimethylhydroxysiloxy-endblocked dimethylsiloxane-methylvinylsiloxane copolymers, and
dimethylhydroxysiloxy-endblocked dimethylsiloxane-methylvinylsiloxane-methylphenylsiloxane copolymers.

Diorganopolysiloxane (b) is the component that equips the fixing roll product with toner release properties. This component must contain at least 2 alkenyl groups in each molecule. The molecular structure of component (b) is not specifically restricted and may be, for example, straight chain, partially branched straight chain, resin, network, or cyclic. Straight chain and partially branched straight chain are preferred for the molecular structure. The alkenyl group in component (b) is specifically exemplified by vinyl, allyl, butenyl, pentenyl, and hexenyl, and the vinyl group is preferred. The alkenyl group may be bonded in any position on the molecular chain, for example, in terminal or nonterminal position. There are no limitations on the non-alkenyl organic groups in component (b), and these groups are exemplified by alkyl groups such as methyl, ethyl, propyl, and so forth; aryl groups such as phenyl, tolyl, xylyl, and so forth; aralkyl groups such as benzyl, phenethyl, and so forth; and substituted alkyl groups such as 3-chloropropyl, 3,3,3-trifluoropropyl, and so forth. Methyl and phenyl are the preferred non-alkenyl organic groups.

Component (b) must have a viscosity at 25° C. of at least 1,000,000 centipoise. The fixing roll product has sharply reduced toner release properties as well as a diminished mechanical strength when component (b) has a viscosity below 1,000,000 centipoise.

Component (b) is specifically exemplified by the following:
dimethylvinylsiloxy-endblocked dimethylpolysiloxane gums,
dimethylvinylsiloxy-endblocked methylvinylpolysiloxane gums,
dimethylvinylsiloxy-endblocked methylphenylpolysiloxane gums,
dimethylvinylsiloxy-endblocked dimethylsiloxane-methylvinylsiloxane copolymer gums,
dimethylvinylsiloxy-endblocked dimethylsiloxane-methylphenylsiloxane copolymer gums,
dimethylvinylsiloxy-endblocked dimethylsiloxane-methylvinylsiloxane-methylphenylsiloxane copolymer gums,
trimethylsiloxy-endblocked methylvinylpolysiloxane gums,
trimethylsiloxy-endblocked dimethylsiloxane-methylvinylsiloxane copolymer gums,
trimethylsiloxy-endblocked dimethylsiloxane-methylvinylsiloxane-methylphenylsiloxane copolymer gums,
dimethylhydroxysiloxy-endblocked methylvinylpolysiloxane gums,
dimethylhydroxysiloxy-endblocked dimethylsiloxane-methylvinylsiloxane copolymer gums, and
dimethylhydroxysiloxy-endblocked dimethylsiloxane-methylvinylsiloxane-methylphenylsiloxane copolymer gums.

Component (A) is to contain 10 to 90 weight % component (a) with component (b) making up the remainder. The toner release properties of the fixing roll product are sharply reduced when component (A) contains more than 90 weight % component (a). At the other extreme, the resulting silicone rubber composition suffers from a sharply reduced curability and is also extremely difficult to handle when component (A) contains less that 10 weight % component (a).

The organopolysiloxane resin (B) functions to improve the mechanical strength of the fixing roll product. This component has the following general formula.

$$(R_3SiO_{1/2})_x(SiO_{4/2})_{1.0}$$

The group R in this formula denotes monovalent hydrocarbon groups, and the monovalent hydrocarbon groups comprising R are specifically exemplified by alkyl groups such as methyl, ethyl, propyl, and so forth; alkenyl groups such as vinyl, allyl, butenyl, pentenyl, hexenyl, and so forth; aryl groups such as phenyl, tolyl, xylyl, and so forth; aralkyl groups such as benzyl, phenethyl, and so forth; and 3-chloropropyl and 3,3,3-trifluoropropyl. At least one group R is preferably alkenyl. The subscript E in the preceding formula has a value of 0.6 to 4.0. The bases for this range are as follows: the use of organopolysiloxane resin having a value of x less than 0.6 yields a fixing roll with a sharply reduced mechanical strength, while organopolysiloxane resin in which x exceeds 4.0 does not exist. Component (B) may contain the following siloxane units on an optional basis as long as the object of the present invention is not impaired: siloxane unit with the general formula $$(R_2SiO_{2/2})$$ (R defined as above)

and siloxane unit with the general formula $$(RSiO_{3/2})$$ (R defined as above).

Component (B) is added to the invention composition at 5 to 100 weight parts per 100 weight parts component (A). The addition of component (B) at less than 5 weight parts per 100 weight parts component (A) yields a fixing roll product with a reduced mechanical strength. At the other extreme, silicone rubber compositions produced using more than 100 weight parts component (B) per 100 weight parts component (A) become very difficult to mold into fixing rolls.

Organopolysiloxane (C) is a crosslinker that functions to cure the invention composition, and it must contain at least 2 silicon-bonded hydrogen atoms in each molecule. While the viscosity of component (C) is not particularly restricted, viscosities in the range of 10 to 5,000 centipoise are specifically preferred. The molecular structure of component (C) is also not particularly restricted and is exemplified by straight chain, partially branched straight chain, resin, network, and cyclic. Straight-chain and partially branched straight-chain molecular structures are preferred. No particular restrictions apply to the bonding position for the silicon-bonded hydrogen in component (C), and it may be bonded, for example, in terminal or nonterminal position on the molecular chain. The organic groups in component (C) are not particularly restricted and are specifically exemplified by monovalent hydrocarbon groups such as alkyl groups, e.g., methyl, ethyl, propyl, and so forth; aryl groups, e.g., phenyl, tolyl, xylyl, and so forth; aralkyl groups, e.g., benzyl, phenethyl, and so forth; and 3-chloropropyl, 3,3,3-trifluoropropyl, and so forth.

Component (C) is specifically exemplified by the following:

dimethylhydrogensiloxy-endblocked dimethylpolysiloxanes, dimethylhydrogensiloxy-endblocked methylhydrogenpolysiloxanes, dimethylhydrogensiloxy-endblocked methylphenylpolysiloxanes, dimethylhydrogensiloxy-endblocked dimethylsiloxane-methylhydrogensiloxane copolymers, dimethylhydrogensiloxy-endblocked dimethylsiloxane-methylphenylsiloxane copolymers, trimethylsiloxy-endblocked methylhydrogenpolysiloxanes, trimethylsiloxy-endblocked dimethylsiloxane-methylhydrogensiloxane copolymers, trimethylsiloxy-endblocked methylhydrogensiloxane-methylphenylsiloxane copolymers, dimethylhydroxysiloxy-endblocked methylhydrogenpolysiloxanes, dimethylhydroxysiloxy-endblocked dimethylsiloxane-methylhydrogensiloxane copolymers, dimethylhydroxysiloxy-endblocked dimethylsiloxane-methylhydrogensiloxane-methylphenylsiloxane copolymers, and dimethylhydroxysiloxy-endblocked methylhydrogensiloxane-methylphenylsiloxane copolymers.

Component (C) is added to the invention composition in a quantity that yields 0.6 to 20 moles silicon-bonded hydrogen from component (C) per 1 mole total alkenyl group from components (A) and (B). When component (C) is added in a quantity that provides less than 0.6 moles silicon-bonded hydrogen from component (C) per 1 mole total alkenyl group from components (A) and (B), the resulting silicone rubber composition will not undergo an adequate cure and the fixing roll afforded thereby will be unusable in practical applications. When, on the other hand, component (C) is added in a quantity that provides more than 20 moles silicon-bonded hydrogen from component (C) per 1 mole total alkenyl group from components (A) and (B), large amounts of hydrogen gas will be produced during curing, which sharply reduces the mechanical strength of the fixing roll product, and the heat resistance of the resulting fixing roll will also be impaired.

The platinum catalyst (D) accelerates the cure of the invention composition. No particular restrictions apply to component (D), and it is specifically exemplified by chloroplatinic acid, alcohol solutions of chloroplatinic acid, chloroplatinic acid-olefin complexes, chloroplatinic acid-vinylsiloxane complexes, platinum supported on silica, platinum supported on active carbon, and platinum black.

Component (D) is added to the invention composition in a catalytic quantity. In specific terms, its preferred addition provides 0.1 to 500 weight parts platinum metal from component (D) for each 1 million weight parts of the total of components (A) and (B). The particularly preferred addition of component (D) provides 1 to 50 weight parts platinum metal from component (D) for each 1 million weight parts of the total of components (A) and (B). When component (D) is added at less than 0.1 weight parts platinum metal from component (D) for each 1 million weight parts of the total of components (A) and (B), the resulting silicone rubber composition will have a very slow cure rate. On the other hand, it is economically undesirable to add component (D) at more than 500 weight parts platinum metal from component (D) for each 1 million weight parts of the total of components (A) and (B).

The composition of the present invention is prepared by blending components (A) to (D) to homogeneity. The invention composition is characterized by its lack of inorganic filler. The procedure for preparing the invention composition is not specifically restricted. The invention composition can be prepared, for example, by mixing components (A) to (D) to homogeneity in a stirring device such as a Ross mixer, planetary mixer, Henschel mixer, butterfly mixer, Hobart mixer, and so forth.

Components that may be added to the composition of the present invention on an optional basis are exemplified by cure inhibitors such as acetylenic compounds, hydrazines, triazoles, phosphines, mercaptans, and so forth, which may be added in order to regulate or adjust the storage stability and use time of the invention composition; unreactive organopolysiloxane oils, which may be added in order to improve the toner release performance; organopolysiloxanes that contain only a single alkenyl group in each molecule, which are used in order to lower the modulus of the silicone rubber; heat stabilizers; flame retardants such as triazoles and so forth; and plasticizers.

The method for fabricating fixing rolls from the invention composition is not specifically restricted. Fixing rolls can be fabricated from the invention composition, for example, by uniformly coating the invention composition over the circumference of a metal shaft and heating the assembly, or by forming a layer of inorganic filler-containing silicone rubber over the circumference of a metal shaft and then coating the invention composition on the surface of this silicone rubber layer and heating. The curing conditions for the invention composition are also not specifically restricted and are exemplified by heating at 100° C. to 200° C. for 2 to 30 minutes followed on an optional basis by post-curing the fixing roll for 30 minutes to 4 hours at 150° C. to 220° C. No specific restrictions apply to the hardness of the silicone rubber on fixing rolls fabricated as described above, but the JIS A hardness as specified in JIS C 2123 is preferably 10 to 70. Finally, the thickness of the silicone rubber on the fixing roll is not specifically restricted and should be selected as appropriate as a function of the device in which the fixing roll will be used.

Because fixing rolls afforded by the cure of the invention composition have excellent toner release properties and excellent mechanical strength, they can be used as fixing rolls in devices such as electrophotographic copiers, facsimile machines, and laser printers. Moreover, fixing rolls with excellent toner release properties can be prepared by layering the invention composition over the circumference of a conventional fixing roll and then curing the invention composition.

The silicone rubber composition in accordance with the present invention for fixing roll service is explained in greater detail hereinafter through working examples. These examples are not intended to limit the scope of the present claims. In the examples, the viscosity was measured at 25° C., and the physical properties of the silicone rubbers were measured by the methods in JIS C 2123. In order to evaluate the toner release performance of the fixing rolls, each fixing roll was installed in an electrophotographic copier and copying (A4 size) was carried out on a continuous basis. The copy count was determined at which a clear copy could no longer be obtained.

EXAMPLE 1

A silicone rubber composition in accordance with the present invention for fixing roll service was prepared by mixing the following to homogeneity: 80 weight parts dimethylvinylsiloxy-endblocked dimethylpolysiloxane with a viscosity of 2,000 cP, 20 weight parts dimethylvinylsiloxy-endblocked dimethylpolysiloxane with a viscosity of 10,000,000 cP, 10 weight parts methylpolysiloxane resin (viscosity=230 cP) with the formula $[(CH_3)_3SiO_{1/2}]_{1.38}[CH_2=CH(CH_3)_2SiO_{1/2}]_{0.44}(SiO_{4/2})_{1.0}$, 7 weight parts methylhydrogenpolysiloxane (silicon-bonded hydrogen content=0.7 weight %) with the formula $[(CH_3)_3SiO_{1/2}]_{20}[(CH_3)_2SiO_{2/2}]_{45}8\ CH_3\ SiO_{3/2}]_{10}$, and 0.5 weight parts chloroplatinic acid/1,3-divinyl-1,1,3,3-tetramethyldisiloxane complex (platinum metal content in the complex=0.4 weight %). This composition was cured by hot-pressing for 5 minutes at 150° C. and post-cured for 4 hours in a 200° C. forced circulation oven. The tensile strength of the resulting silicone rubber was 25.0 kgf/cm².

A fixing roll was also fabricated using this composition. First, a fixing roll primer (DY39-032A/B Primer from Dow Corning Toray Silicone Company, Limited) was coated and dried over the circumference of a cylindrical steel roll core. The roll core was set into a roll-fabrication mold and the composition was filled under pressure into the cavity. After filling, the composition was cured by heating for 10 minutes at 150° C., and the fixing roll was then de-molded. The fixing roll was thereafter held in a 200° C. forced circulation oven for 4 hours. The fixing roll labelled (A) in Table 1 was cooled and the toner release capacity tested. The toner release results for this fixing roll are reported in Table 1.

EXAMPLE 2

A comparative silicone rubber composition for fixing roll service was prepared by mixing the following to homogeneity: 100 weight parts dimethylvinylsiloxy-endblocked dimethylpolysiloxane with a viscosity of 2,000 cP, 20 weight parts methylpolysiloxane resin (viscosity=230 cP) with the formula $[(CH_3)_3SiO_{1/2}]_{1.38}[CH_2=CH(CH_3)_2SiO_{1/2}]_{0.44}(SiO_{4/2})_{1.0}$, 12 weight parts methylhydrogenpolysiloxane (silicon-bonded hydrogen content=0.7 weight %) with the formula $[(CH_3)_3SiO_{1/2}]_{20}[(CH_3)_2SiO_{2/2}]_{20}[(CH_3)_2(CH_3)HSiO_{2/2}]_{45}[CH_3SiO_{3/2}]_{10}$, and 0.5 weight parts chloroplatinic acid/1,3-divinyl-1,1,3,3-tetramethyldisiloxane complex (platinum metal content in the complex=0.4 weight %). The silicone rubber afforded by curing this composition under the same conditions as in Example 1 had a tensile strength of 35.0 kgf/cm². A fixing roll (B) was also fabricated under the same conditions as in Example 1, and the toner release results for this fixing roll are reported in Table 1.

EXAMPLE 3

A comparative silicon rubber composition for fixing roll service was prepared by mixing the following to homogeneity:

100 weight parts dimethylvinylsiloxy-endblocked dimethylpolysiloxane with a viscosity of 2,000 cP, 20 weight parts methylpolysiloxane resin (viscosity=230 cP) with the formula $[(CH_3)_3SiO_{1/2}]_{1.38}[CH_2=CH(CH_3)_2SiO_{1/2}]_{0.44}(SiO_{4/2})_{10}$, and 50 weight parts quartz powder. A base compound was prepared by heating this mixture for 2 hours at 170° C. in a vacuum and then cooling. Twelve weight parts methylhydrogenpolysiloxane (silicon-bonded hydrogen content=0.7 weight %) with the formula $[(CH_3)_3SiO_{1/2}]_{20}[(CH_3)_2SiO_{2/2}]_{20}[(CH_3)HSiO_{2/2+ee}]_{45}[CH_3SiO_{3/2}]_{10}$ and 0.5 weight parts chloroplatinic acid/1,3-divinyl-1,1,3,3-tetramethyldisiloxane complex (platinum metal content in the complex=0.4 weight %) were subsequently mixed to homogeneity into 150 weight parts of the base compound to yield a comparative silicone rubber composition for fixing roll service. The silicone rubber afforded by curing this composition under the same conditions as in Example 1 had a tensile strength of 50.0 kgf/cm². A comparative fixing roll (C) was also fabricated under the same conditions as in Example 1, and the toner release results for this fixing roll are reported in Table 1.

EXAMPLE 4

A comparative silicone rubber composition for fixing roll service was prepared by mixing the following to homogeneity:

100 weight parts trimethylsiloxy-endblocked dimethylsiloxane-methylvinylsiloxane copolymer (10,000 cP, 99.0 mole % dimethylsiloxane unit, 1 mole % methylvinylsiloxane unit), 5 weight parts fumed silica with a specific surface area of 200 m²/g, 20 weight parts quartz powder, 4 weight parts hexamethyldisilazane (for treatment of the surface of the silica), and 1 weight part water were mixed to homogeneity. A base compound was prepared by heating this mixture for 2 hours at 170° C. in a vacuum and then cooling. Three weight parts trimethylsiloxy-endblocked dimethylsiloxane-methylhydrogensiloxane copolymer (silicon-bonded hydrogen content=0.7 weight %) and 0.5 weight parts chloroplatinic acid/1,3-divinyl-1,1, 3,3-tetramethyldisiloxane complex (platinum metal content in the complex=0.4 weight %) were subsequently mixed to homogeneity into 125 weight parts of the base compound to yield a comparative silicone rubber composition for fixing roll service. The silicone rubber afforded by curing this composition under the same conditions as in Example 1 had a tensile strength of 25.0 kgf/cm². A comparative fixing roll (D) was also fabricated under the same conditions as in Example 1, and the toner release results for this fixing roll are reported in Table 1.

EXAMPLE 5

A primer was painted on the circumference of a fixing roll (D) as prepared in Example 4. The primer was dried and the fixing roll was set into a roll-fabrication mold. Silicone rubber composition for fixing roll service as prepared in Example 1 was filled into the cavity under pressure. After filling, the composition was cured by heating for 10 minutes at 150° C. and the fixing roll was then de-molded. Holding this fixing roll for 4 hours in a 200° C. forced circulation oven and subsequently cooling yielded a fixing roll (E). The thickness of this silicone rubber layer was 0.5 mm. The toner release results for this fixing roll are reported in Table 1.

TABLE 1

| Fixing Roll | No. of Copies |
|---|---|
| A | 120,000 |

TABLE 1-continued

| Fixing Roll | No. of Copies |
|---|---|
| B | 70,000 |
| C | 30,000 |
| D | 40,000 |
| E | 130,000 |

We claim:

1. An inorganic filler-free silicone rubber composition for fixing roll service comprising:
   (A) 100 weight parts diorganopolysiloxane mixture consisting essentially of
      (a) 10 to 90 weight % diorganopolysiloxane that contains at least 2 alkenyl groups in each molecule and that has a viscosity at 25° C. of 100 to 100,000 centipoise and
      (b) 90 to 10 weight % diorganopolysiloxane that contains at least 2 alkenyl groups in each molecule and that has a viscosity at 25° C. of at least 1,000,000 centipoise,
   (B) 5 to 100 weight parts organopolysiloxane resin with the general formula $(R_3SiO_{1/2})_x(SiO_{4/2})_{1.0}$ in which R denotes a monovalent hydrocarbon group and x has a value of 0.6 to 4.0,
   (C) organopolysiloxane that contains at least 2 silicon-bonded hydrogen atoms in each molecule, in a quantity that yields 0.6 to 20 moles silicon-bonded hydrogen in component (C) per 1 mole total alkenyl group in components (A) and (B), and
   (D) platinum catalyst in a catalytic quantity.

2. A composition according to claim 1, where the alkenyl groups of component (A)(a) are vinyl.

3. A composition according to claim 1, where the non-alkenyl groups of component (A)(a) are selected from a group consisting of methyl and phenyl.

4. A composition according to claim 1, where the alkenyl groups of component (A)(b) are vinyl.

5. A composition according to claim 1, where the non-alkenyl groups of component (A)(b) are selected from a group consisting of methyl and phenyl.

6. A composition according to claim 1, where at least one of the R groups of component (B) is alkenyl.

7. A composition according to claim 1, where viscosity of component (C) is within a range of 10 centipoise to 5,000 centipoise at 25° C.

8. A composition according to claim 1, where component (C) is selected from a group consisting of straight-chain and partially branched straight-chain molecular structures.

9. A composition according to claim 1, where the platinum catalyst is a chloroplatinic acid/1,3-divinyl-1,1,3,3-tetramethyldisiloxane complex.

10. A composition according to claim 9, where one to 50 weight parts of platinum metal is present for each one million weight parts of the total of component (A) and component (B)

11. A composition according to claim 1, where 0.1 to 500 weight parts of platinum metal is present for each one million weight parts of the total of component (A) and component (B).

12. A composition according to claim 1, where the alkenyl groups of component (A)(a) are vinyl, the non-alkenyl groups of component (A)(a) are selected from a group consisting of methyl and phenyl, the alkenyl groups of component (A)(b) are vinyl, the non-alkenyl groups of component (A)(b) are selected from a group consisting of methyl and phenyl, at least one of the R groups of component (B) is alkenyl, and the viscosity of component (C) is within a range of 10 centipoise to 5,000 centipoise at 25° C.

13. A cured composition according to claim 1.

14. A fixing roll service comprising: a core coated with a composition comprising
   (A) 100 weight parts diorganopolysiloxane mixture consisting essentially of
      (a) 10 to 90 weight % diorganopolysiloxane that contains at least 2 alkenyl groups in each molecule and that has a viscosity at 25° C. of 100 to 100,000 centipoise and
      (b) 90 to 10 weight % diorganopolysiloxane that contains at least 2 alkenyl groups in each molecule and that has a viscosity at 25° C. of at least 1,000,000 centipoise,
   (B) 5 to 100 weight parts organopolysiloxane resin with the general formula $(R_3SiO_{1/2})_x(SiO_{4/2})_{1.0}$ in which R denotes a monovalent hydrocarbon group and x has a value of 0.6 to 4.0,
   (C) organopolysiloxane that contains at least 2 silicon-bonded hydrogen atoms in each molecule, in a quantity that yields 0.6 to 20 moles silicon-bonded hydrogen in component (C) per 1 mole total alkenyl group in components (A) and (B), and
   (D) platinum catalyst in a catalytic quantity; where the composition is cured.

15. A fixing roll service according to claim 14, where the alkenyl groups of component (A)(a) are vinyl, the non-alkenyl groups of component (A)(a) are selected from a group consisting of methyl and phenyl, the alkenyl groups of component (A)(b) are vinyl, the non-alkenyl groups of component (A)(b) are selected from a group consisting of methyl and phenyl, at least one of the R groups of component (B) is alkenyl, and the viscosity of component (C) is within a range of 10 centipoise to 5,000 centipoise at 25° C.

16. A fixing roll service according to claim 15 where the platinum catalyst is a chloroplatinic acid/1,3-divinyl-1,1,3,3-tetramethyldisiloxane complex.

* * * * *